United States Patent Office 3,495,256
Patented Feb. 10, 1970

3,495,256
ALKOXY-SUBSTITUTED 6-HYDROXY-5H-DIBENZO [a,c]CYCLOHEPTENE - 7 - CARBONITRILES AND PREPARATION FROM ALKOXY-SUBSTITUTED 6-AMINO - 5H - DIBENZO[a,c]CYCLOHEPTENE-7- CARBONITRILES, BY HYDROLYSIS
Arnold Brossi, Verona, and Benjamin Pecherer, Montclair, N.J., assignors to Hoffmann-La Roche Inc., Nutley, N.J., a corporation of New Jersey
No Drawing. Original application Feb. 17, 1967, Ser. No. 616,803, now Patent No. 3,457,295, dated July 22, 1969. Divided and this application Apr. 10, 1969, Ser. No. 815,213
Int. Cl. C07c 121/04
U.S. Cl. 260—465                              5 Claims

ABSTRACT OF THE DISCLOSURE

Alkoxy-substituted 6-amino-5H-dibenzo[a,c]cylcoheptene-7-carbonitriles and their preparation which carbonitriles are useful as intermediates in a stepwise synthesis of 3,4′,5,5′ - tetra - methoxy-dibenzo[d,f]azonine and analogs.

CROSS-REFERENCE TO RELATED APPLICATIONS

This application is a division of U.S. patent application Ser. No. 616,803, filed Feb. 17, 1967 now U.S. Patent 3,457,295, issued July 22, 1969.

BRIEF SUMMARY OF THE INVENTION

This invention relates to a process for the synthesis of substituted dibenzo[d,f]azonines and to intermediates useful therein. More particularly, the invention relates to a practical synthetic route for the preparation of compounds of the formula:

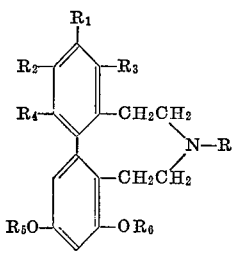

(IX)

wherein R is lower alkyl, lower alkenyl, lower alkynyl, cyclo-lower alkyl, cycloalkyl-lower alkyl, aryl, aralkyl, lower alkoxy-lower alkyl or dialkylaminoalkyl; $R_1$ is hydrogen, lower alkyl, lower alkoxy or benzyloxy; $R_2$ is lower alkyl, lower alkoxy or benzyloxy; $R_3$ and $R_4$ are each independently hydrogen, lower alkyl or lower alkoxy; and $R_5$ and $R_6$ are each independently methyl or ethyl.

DETAILED DESCRIPTION

Compounds of Formula IX are a valuable class of pharmaceutically useful compounds. They act upon the central nervous system and are also useful as hypotensive agents. More particularly, the compound 3,4′,5,5′-tetramethoxy-dibenzo[d,f]azonine (protostephanine), which is available as an extract from the menispermaceous plant *Stephania japonica* Miers, is known to have central depressant and hypotensive action. Accordingly, this invention, in its specific process aspect, relates to a practical synthetic route to the known pharmaceutically useful dibenzo[d,f]azonine: protostephanine.

The novel process of this invention can be readily traced by reference to the following schematic diagram.

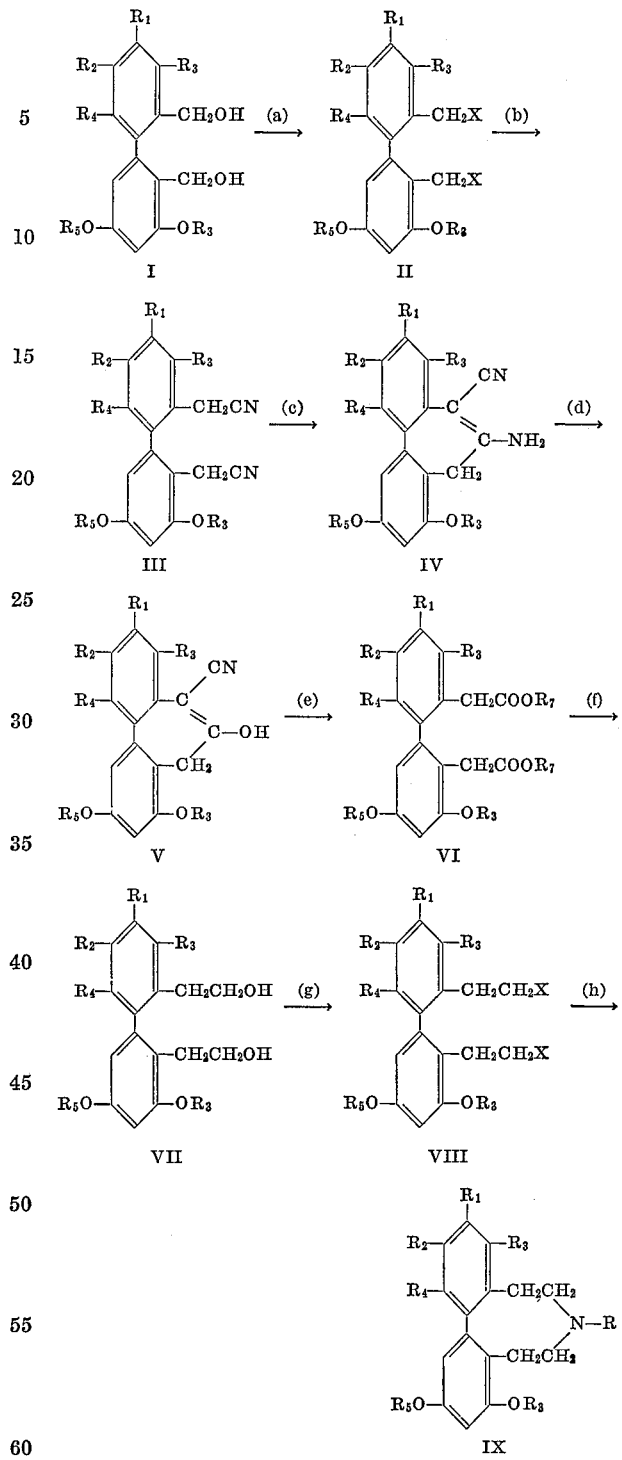

wherein the symbols R, $R_1$, $R_2$, $R_3$, $R_4$, $R_5$ and $R_6$ all have the same meaning as like symbols in Formula IX above; $R_7$ is hydrogen or lower alkyl; and X is a leaving group such as the halogens, chlorine, bromine and iodine, and obvious equivalent leaving groups.

As used herein, the term "lower alkyl" denotes straight and branched chain hydrocarbons having 1 to 7 carbon atoms such as methyl, ethyl, propyl, isopropyl, butyl, t-butyl, and the like. Lower alkyl groups having 1 to 4 carbon atoms are preferred. The term "lower alkoxy" denotes lower alkyl ether groups wherein the lower alkyl moiety is as defined above. The term "lower alkenyl" denotes unsaturated hydrocarbon groups containing 1 to 7 carbon atoms and at least one double bond such as allyl, 2-butenyl, 3-butenyl, and the like. "Lower alkynyl" denotes unsaturated hydrocarbons having 1 to 7 carbon atoms and at least one triple bond such as 2-propynyl, 2-butynyl, 3-butynyl, and the like. The term "cycloalkyl" denotes saturated carbocyclic groups containing 3 to 6 ring atoms. The term "aryl" denotes phenyl and substituted phenyl groups, preferably methoxyphenyl or poly-methoxyphenyl. The term "aralkyl" denotes arylalkyl groups such as benzyl, phenethyl, methoxyphenethyl, poly-methoxyphenethyl, and the like. The terms "halo," "halogen," "halide," and the like, denote the halogens ch'orine, bromine and iodine.

The novel process of this invention as outlined above comprises the steps of:

(a) Treating a diol of Formula I with a halogenating agent such as phosphorus tribromide, phorphorus trichloride, and the like, to form a dihalide of Formula II. The reaction is suitably carried out at a temperature between about −10° C. and about room temperature, though higher or lower temperatures could also be employed. It is preferred to carry out the reaction in an inert organic solvent such as an ether, e.g., diethyl ether, or a hydrocarbon solvent such as benzene, toluene, and the like. The starting diols of Formula I are known compounds or analogs of known compounds, the preparation of which will be readily apparent to those skilled in the art by analogy to the processes for the preparation of the known starting materials.

(b) Treating the dihalide obtained in step (a) above with an alkali metal cyanide, e.g., potassium cyanide, sodium cyanide, etc., to form a diacetonitrile of Formula III. The reaction is suitably carried out in the presence of an inert organic solvent such as dimethylsulfoxide, or aqueous alcohols, and at about room temperature to about 50° C., though higher or lower temperatures could also be employed.

(c) Treating the diacetonitrile obtained in step (b) above with a catalytic amount of a base to form a cyclic aminonitrile of Formula IV. The reaction is suitably carried out in an inert organic solvent. Preferred solvents are the lower alkanols, especially ethanol. As the base catalyst there can be employed any of the strong bases such as the alkali metal hydroxides. The amount of base employed may vary from a catalytic quantity to a molecular proportion, although it is preferred to use less than 10 percent by weight based on the diacetonitrile intermediate. However, it is preferred to utilize an alkali metal alcoholate while conducting the reaction in an alcohol solvent. The reaction can be conveniently conducted at the reflux temperature of the alkanol used as the solvent, though higher or lower temperatures can also be utilized. It is preferred, however, to operate between a range of about 20° C. to about 100° C. The aminonitriles of Formula IV are capable of imino-amino tautomerization. Both the imino and the amino forms are comprehended by this invention.

(d) Subjecting the cyclic aminonitrile of Formula IV to acid hydrolysis to obtain the hydroxynitrile of Formula V. The acid hydrolysis is readily effected with any of the usual acids. Preferred acids are the strong acids, e.g., mineral acids, such as hydrochloric acid, sulfuric acid, and the like. The hydrolysis can, if desired, be effected at temperatures above or below room temperature, though preferably at a temperature of about 100° C. The reaction can be carried out in the absence of any organic solvent or it can be carried out in the presence of an inert organic solvent such as a hydrocarbon solvent, for example, toluene, xylene, etc. The hydroxynitrile of Formula V is capable of keto-enol tautomerization and both the keto and enol forms are comprehended by this invention.

(e) Treating the hydroxynitrile of Formula V with an alkali metal hydroxide whereby there is obtained simultaneous saponification and ring cleavage to give the diacetic acid of Formula VI. The saponification and ring cleavage is preferably carried out at an elevated temperature in the presence of an inert organic solvent. A preferred temperature range is between about room temperature and the reflux temperature of the reaction mixture. Preferred solvents are the inert organic solvents such as lower alkanols, hydrocarbon solvents, and the like. The acid of Formula VI can be readily esterified with lower alkanols. Esterification of the acids is readily effected by any of the usual techniques for esterifying with lower alkanols or by treatment with an alkylating agent, e.g., by treatment with diazomethane.

(f) Reduction of the diacetic acid of Formula VI by treatment with an alkali hydride/metal hydride complex, for example, with an alkali metal aluminum hydride complex or a similar complex hydride such as the aluminum or boron hydride complexes of the alkali metals such as lithium, sodium, potassium, and the like. The reduction is preferably effected with lithium aluminum hydride. The reduction is suitably carried out in the presence of an inert organic solvent such as an ether, e.g., the lower alkyl ethers, tetrahydrofuran, and the like, and preferably at a temperature between about 0° C. and 100° C.

(g) Treating the diol of Formula VII with a phosphorus tribromide, phosphorus trichloride, and the like; a hydrohalic acid, e.g., hydrobromic acid, etc.; or another equivalent reagent to form an intermediate of Formula VIII, e.g., a dihalide. The reaction is suitably carried out in an inert organic solvent such as an aromatic hydrocarbon, a lower ether or halogenated solvent, at a temperature between about −10° C. and about 85° C.

(h) Treating the intermediate of Formula VIII obtained according to step (g) above, e.g., a dihalide of Formula VIII, with a primary amine to form the dibenzo[d,f]azonine end products of Formula IX. The primary amines which are suitable for use in this condensation reaction are the lower alkylamines, for example, methylamine, ethylamine, propylamine, n-butylamine, isobutylamine, t-butylamine, pentylamine, etc.; the lower alkenylamines, for example, allylamine, butenylamine, etc.; the lower alkynylamines, for example, propargylamine, etc.; the cyclo-lower alkylamines, for example, cyclopropylamine, cyclohexylamine, etc.; the cyclo-lower alkyl-lower alkylamines, for example, cyclopropylmethylamine, cyclohexylmethylamine, etc.; the arylamines, for example, aniline, methoxyaniline, e.g., p-methoxyaniline, etc.; aralkylamines, for example, benzylamine, methoxybenzylamine, phenethylamine, etc.; lower alkoxy-lower alkylamines, for example, 2-ethoxyethylamine, etc.; dialkylamino-lower alkylamines, for example, dimethylaminoethylamine, diethylamino-ethylamine, etc. The condensation with a primary amine is conveniently carried out by treating the intermediate of Formula VIII with the amine reactant preferably utilizing at least a two-molar excess of the amine reactant in the presence of an acid-binding agent which can be the excess of the amine reactant or another acid-binding agent such as a hydroxide, carbonate, etc. The reaction is suitably carried out in the presence of an inert organic solvent such as a hydrocarbon solvent, for example, benzene, toluene, etc., or, if desired, where the amine reactant is a liquid, it can also be employed as solvent. The reaction temperature is not critical but it is preferred to operate at an elevated temperature, preferably at a temperature between about room temperature and about 200° C.

The intermediates of Formulae IV and V are novel compounds which constitute a part of this invention. The compounds of Formulae IV and V, as noted above, can exist in tautomeric forms. It is understood that all such forms are comprehended by the structural representation herein. The novel compounds of Formulae IV and V are, as noted above, useful as intermediates in the preparation of the pharmaceutically useful dibenzo[d,f] azonines of Formula IX.

The invention will be more fully understood from the examples which follow. These examples are intended to illustrate the invention.

EXAMPLE 1

Preparation of α,α'-dibromo-3,4',5,5'-tetramethoxy-o,o'-bitolyl

To a stirred suspension of 70 g. (0.21 mole) of 3,4',5,5'-tetramethoxybiphenyl-2,2'-dimethanol in 2.1 l. of dry ether, 56.8 g. (0.21 mole) of phosphorus tribromide was added dropwise at −4 to 0° over a 20 min. period, and then the mixture was allowed to warm to room temperature. After 24 hours of stirring a dense white solid had precipitated. The suspension was poured into ice water, 1 l. of benzene was added and the mixture stirred until all the solid had dissolved. The organic phase was washed successively with water, saturated bicarbonate solution, water and dried. Removal of the solvent at reduced pressure yielded α,α'-dibromo-3,4',5,5'-tetramethoxy-o,o'-bitolyl as a buff solid, M.P. 118–120°. After recrystallization from petroleum ether the product was obtained as white crystals of M.P. 124–126°. IR(CHCl$_3$): 3000, 2940, 2830, 1603, 1520 cm.$^{-1}$.

Analysis.—Calcd. for C$_{18}$H$_{20}$Br$_2$O$_4$: C, 46.98; H, 4.38; Br, 34.73. Found: C, 46.89; H, 4.63; Br, 34.84.

EXAMPLE 2

Preparation of 3,4',5,5'-tetramethoxy-2,2'-biphenyl-diacetonitrile

One hundred and seventy grams (0.37 mole) of α,α'-dibromo-3,4',5,5'-tetramethoxy-o,o'-bitolyl was added to a stirred suspension of 76 g. (1.11 moles) of potassium cyanide (95%) in 3 l. of dimethyl-sulfoxide. The temperature rose to 30° and after 45 min. at this temperature, the mixture was poured into ice-water with vigorous stirring, whereupon the initially formed oil solidified. The solid was collected by filtration, washed with water and dried giving 3,4',5,5'-tetramethoxy-2,2'-biphenyl diacetonitrile, M.P. 105–107°. Recrystallization from ethanol gave the product as tan crystals, M.P. 109–111°. A colorless analytical sample was obtained by one more recrystallization from ethyl acetate-petroleum ether (60–90°), M.P. 116.5–118.5°. IR(CHCl$_3$): 3005, 2960, 2930, 2840, 2245, 1600, 1520 cm.$^{-1}$.

Analysis.—Calcd. for C$_{20}$H$_{20}$N$_2$O$_4$: C, 68.17; H, 5.72; N, 7.95. Found: C, 67.92; H, 5.98; N, 8.04.

EXAMPLE 3

Preparation of 6-amino-2,4,9,10-tetramethoxy-5H-dibenzo[a,c]cycloheptene-7-carbonitrile Sixty-four grams of 3,4',5,5'-tetramethoxy-2,2'-biphenyldiacetonitrile was dissolved in 700 ml. of boiling ethanol and 10.9 ml. of a 3% solution of sodium ethoxide was added. After 2 hrs. of refluxing, the solution was chilled for 18 hrs. The crystalline solid which separated was collected, washed with ethanol and dried to yield 6-amino-2,4,9,10 - tetramethoxy-5H-dibenzo[a,c]cycloheptene-7-carbonitrile as a white solid, M.P. 197–198°. IR(KBr): 3450, 3350, 3220, 2930, 2828, 2190, 1635, 1588, 1513 cm.$^{-1}$.

Analysis.—Calcd. for C$_{20}$H$_{20}$N$_2$O$_4$: C, 68.17; H, 5.72; N, 7.95. Found: C, 68,23; H, 6.02; N, 7.82.

EXAMPLE 4

Preparation of 6,7 - dihydro - 2,4,9,10 - tetramethoxy - 6 - oxo - 5H - dibenzo[a,c]cycloheptene - 7 - carbonitrile ⇌ 6 - hydroxy - 2,4,9,10 - tetramethoxy - 5H - dibenzo [a,c]cycloheptene - 7 - carbonitrile Sixty-four grams of 6-amino-2,4,9,10-tetramethoxy-5H-dibenzo[a,c]cycloheptene-7-carbonitrile was refluxed for 0.5 hr. with 1.82 l. of 6 N hydrochloric acid and a few ml. of xylene. The suspension was chilled for one hr., the solid was collected, washed free of acid and dried. This product (64 g., M.P. 216–218°) after recrystallization from ethanol, melted at 220–221.5°. The IR(KBr) showed a sharp band at 3585, others at 3010, 2960, 2940, 2250, 2200, 1740, 1610 and 1510 cm.$^{-1}$, which indicated that in the solid state the substance is a keto-enol mixture of 6,7 - dihydro - 2,4,9,10 - tetramethoxy - 6 - oxo - 5H - dibenzo[a,c]cycloheptene-7-carbonitrile and 6-hydroxy-2,4,9,10 - tetramethoxy - 5H - dibenzo[a,c]cycloheptene-7-carbonitrile.

Analysis.—Calcd. for C$_{20}$H$_{19}$NO$_5$: C, 67.98; H, 5.42; N, 3.96. Found: C, 67.66; H, 5.59; N, 3.86.

EXAMPLE 5

Preparation of 3,4',5,5'-tetramethoxy-2,2'-biphenyl-diacetic acid

A suspension of 64 g. (0.181 mole) of 6,7-dihydro-2,4,9,10 - tetramethoxy - 6 - oxo - 5H - dibenzo[a,c]cycloheptene-7-carbonitrile in a mixture of 640 ml. of 30% sodium hydroxide and 400 ml. of methanol was refluxed for 24 hrs. The cooled, turbid solution was diluted with 2 l. of water and extracted with two 300 ml. portions of ether. Acidification of the aqueous layer precipitated an oil which was extracted with three 300 ml. portions of chloroform. The combined extracts were washed with water and dried. Distillation of the solvent under reduced pressure gave an oily residue which solidified when triturated with ethyl acetate. Filtration gave 3,4',5,5'-tetramethoxy-2,2'-biphenyldiacetic acid as a white solid, M.P. 193.5–194.5° which after recrystallization from ethyl acetate melted at 197–198°. IR(KBr): 2950, 2435, 1710, 1605, 1590, 1515 cm.$^{-1}$.

Analysis.—Calcd. for C$_{20}$H$_{22}$O$_8$: C, 61.53; H, 5.68. Found: C, 61.84; H, 5.59.

EXAMPLE 6

Preparation of dimethyl ester of 3,4',5,5'-tetramethoxy-2,2'-biphenyl-diacetic acid The 3,4',5,5'-tetramethoxy-2,2'-biphenyl-diacetic acid was esterified in methanol with an excess of diazomethane. Recrystallized from methanol, the ester melted at 100–101.5°. IR(CHCl$_3$): 3025, 2935, 2835, 1730, 1610, 1515 cm.$^{-1}$.

Analysis.—Calcd. for C$_{22}$H$_{26}$O$_8$: C, 63.15; H, 6.26. Found: C, 63.18; H, 6.37.

EXAMPLE 7

Preparation of 3,4',5,5'-tetramethoxy-2,2'-biphenyl diethanol

A solution of 59.4 g. (0.152 mole) of the diacetic acid in 610 ml. of tetrahydrofuran was added dropwise to a stirred suspension of 22.8 g. (0.608 mole) of lithium aluminum hydride in 610 ml. of tetrahydrofuran. The mixture was refluxed for 2 hours., decomposed in the usual way with water, and then filtered (filter aid). From the filtrate, after removal of the solvent, 20 g. of an oil was obtained that was dissolved in ethyl acetate. Chilling yielded 3,4',5,5' - tetramethoxy - 2,2' - biphenyl diethanol, M.P. 127–128°. The cake of oxides was dissolved in 10% hydrochloric acid, the filter aid removed, the filtrate shaken with chloroform, and the aqueous layer discarded. The chloroform layer was washed successively with water, saturated bicarbonate solution, water, and dried. Removal of the solvent gave an oil that on crystallization from ethyl acetate yielded additional 3,4',5,5'-tetramethoxy-2,2'-biphenyl diethanol, M.P. 127–128°. An analytical sample was obtained by recrystallization from ethyl acetate-petroleum ether (60–80°), M.P. 126–127°. IR(CHCl$_3$): 3590, 3500–3330, 3000, 2940, 2820, 2440, 2400, 1600, 1515 cm.$^{-1}$.

Analysis.—Calcd. for C$_{20}$H$_{26}$O$_6$: C, 68.28; H, 7.23. Found: C, 66.57; H, 7.02.

EXAMPLE 8

Preparation of 2,2'-bis(2-bromoethyl)-3,4',5,5'-tetramethoxybiphenyl

One gram (0.00276 mole) of 3,4',5,5'-tetramethoxy-2,2'-biphenyl diethanol was suspended in 28 ml. of dry ether and cooled to 0°. 0.75 g. (0.00276 mole) of phosphorus tribromide was added dropwise. After 10–15 min. a viscous material separated. Addition of an equal volume of benzene rendered the mixture homogeneous. The mixture was poured into 50 ml. of ice water, the organic layer washed with cold water and dried. Distillation of the solvent gave an oil which was dissolved in 3 ml. of benzene and the solution passed through a bed of 5 g. of Woelm alumina grade I. The alumina was washed with 150 ml. of benzene and after removal of the solvent from the combined eluates, 100 mg. of a colorless oil was obtained. The oil solidified to give 2,2'-bis-(2-bromoethyl)-3,4',5,5'-tetramethoxybiphenyl, M.P. 89–91°. Recrystallization from petroleum ether (60–90°) raised the M.P. to 91–92°. IR(KBr): 3000, 2940, 2830, 1605, 1580, 1515 cm.$^{-1}$.

*Analysis.*—Calcd. for $C_{20}H_{24}Br_2O_4$: C, 49.20; H, 4.95; Br, 32.75. Found: C, 48.99; H, 5.01; Br, 32.85.

EXAMPLE 9

Preparation of 6,7,8,9-tetrahydro-2,3,10,12-tetramethoxy-7-methyl-5H-dibenz[d,f]azonine Two hundred and fifty milligrams of 2,2'-bis(2-bromoethyl)-3,4',5,5'-tetramethoxybiphenyl was heated for 2 hours at 140–150° with a solution of 0.5 g. of methylamine in 10 ml. of benzene under 200 lbs. of nitrogen pressure. The bases were extracted into 10% hydrochloric acid, liberated with excess potassium hydroxides, and taken up in ether. The ethereal solution was dried and the solvent distilled to leave 170 mg. of a pale colored syrup which crystallized on standing overnight. The solid was dissolved in 3 ml. of benzene and passed over 10 g. of Woelm alumina, grade II. Elution with 150 ml. of benzene gave 6,7,8,9-tetrahydro-2,3,10,12-tetramethoxy-7-methyl-5H-dibenz[d,f]azonine as a white crystalline solid, M.P. 84–86°.

*Analysis.*—Calcd. for $C_{21}H_{27}NO_4$: C, 70.56; H, 7.61; N, 3.92. Found: C, 70.66; H, 7.84; N, 4.19.

We claim:
1. A compound of the formula

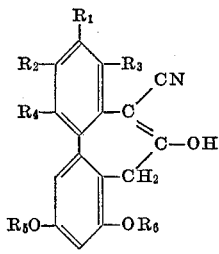

and its keto tautomer wherein $R_1$ is hydrogen, lower alkyl, lower alkoxy or benzyloxy; $R_2$ is lower alkyl, lower alkoxy or benzyloxy; $R_3$ and $R_4$ are each independently hydrogen, lower alkyl or lower alkoxy; and $R_5$ and $R_6$ are each independently methyl or ethyl.

2. The compound according to claim 1, 6-hydroxy-2,4,9,10 - tetramethoxy - 5H - dibenzo[a,c]cycloheptene - 7-carbonitrile.

3. 6,7-dihydro-2,4,9,10-tetramethoxy-6-oxo-5H-dibenzo[a,c]cycloheptene-7-carbonitrile.

4. A process for the preparation of a compound of the formula:

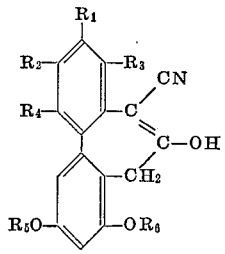

and its keto tautomer wherein $R_1$ is hydrogen, lower alkyl, lower alkoxy or benzyloxy; $R_2$ is lower alkyl, lower alkoxy or benzyloxy; $R_3$ and $R_4$ are each independently hydrogen, lower alkyl or lower alkoxy; and $R_5$ and $R_6$ are each independently methyl or ethyl which comprises hydrolyzing a compound of the formula:

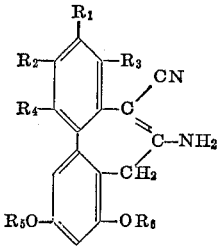

wherein $R_1$, $R_2$, $R_3$, $R_4$, $R_5$ and $R_6$ have the same meaning as above with a mineral acid.

5. The process according to claim 4 wherein 6-hydroxy-2,4,9,10 - tetramethoxy - 5H - dibenzo[a,c]cycloheptene-7-carbonitrile is prepared by hydrolyzing 6-amino-2,4,9,10 - tetramethoxy - 5H - dibenzo[a,c]cycloheptene - 7-carbonitrile with a mineral acid.

References Cited

Wagner et al., Synthetic Organic Chemistry, 1964, pp. 168 and 169.

CHARLES B. PARKER, Primary Examiner

S. T. LAWRENCE, Assistant Examiner